United States Patent [19]
Darcie et al.

[11] Patent Number: 5,519,691
[45] Date of Patent: May 21, 1996

[54] ARRANGEMENT FOR AND METHOD OF PROVIDING RADIO FREQUENCY ACCESS TO A SWITCHING SYSTEM

[75] Inventors: Thomas E. Darcie, Middletown; Mary R. Phillips, Red Bank; Nemmara K. Shankaranarayanan, Roselle Park, all of N.J.

[73] Assignee: AT&T Corp., Murray Hill, N.J.

[21] Appl. No.: 253,464

[22] Filed: Jun. 3, 1994

[51] Int. Cl.$^6$ .................................................. H04J 13/00
[52] U.S. Cl. ........................... 370/18; 370/69.1; 370/95.1; 370/95.3
[58] Field of Search .................................. 370/69.1, 85.7, 370/95.1, 95.3, 17, 18, 85.6, 94.3; 340/825.03, 825.01; 455/17, 33.1, 33.2, 34.1, 34.2, 54.1, 54.2; 375/1

[56] References Cited

U.S. PATENT DOCUMENTS

| | | | |
|---|---|---|---|
| 4,870,408 | 9/1989 | Zdunek et al. | 370/95.1 |
| 5,233,643 | 8/1993 | Naeini et al. | 379/59 |
| 5,276,730 | 1/1994 | Cimini, Jr. et al. | 379/60 |
| 5,276,907 | 1/1994 | Meidan | 455/33.3 |
| 5,280,630 | 1/1994 | Wang | 379/61 |
| 5,327,573 | 7/1994 | Lenchik et al. | 455/34.2 |
| 5,351,240 | 9/1994 | Highsmith | 370/95.1 |

FOREIGN PATENT DOCUMENTS

| | | | |
|---|---|---|---|
| 0526285A2 | 2/1993 | European Pat. Off. | H04H 1/02 |
| 2242806 | 10/1991 | United Kingdom | H04Q 7/00 |

OTHER PUBLICATIONS

Cablevision Systems Corporation, "FCC Experimental License Progress Report," Nov. 1992, pp. 1–11, 27–28, Exhibits 5 and 7. Cited in application; technological background of the invention.

Cablevision Systems Corporation, "FCC Experimental License Progress Reports," Aug. 1993, pp. 10–11, Exhibit III. Cited in application; technological background of the invention.

*Primary Examiner*—Benedict V. Safourek
*Assistant Examiner*—Ajit Patel
*Attorney, Agent, or Firm*—John A. Caccuro

[57] ABSTRACT

A cellular communication system provides dynamic allocation of hardware resources and frequency spectrum. The cellular system includes a server which dynamically controls the assignment of radio ports to a first and second group; each group shares hardware resources. Radio ports assigned to a first group may be reassigned by the server to a second radio port group in response to a predetermined condition, such as when the number of active users in the first group approaches the maximum user capacity of the first group. The transceiver hardware of each radio port is pooled on a group basis at the server location. This increases the user capacity of any radio port of a group to equal the total user capacity available at that group, as well as making more efficient use of transceiver resources.

59 Claims, 11 Drawing Sheets

| RADIO PORT GROUP SERVER | TOTAL USERS SERVED | MICROCELL | USERS IN MICROCELL | ADJOINING SERVER COVERAGE AREA |
|---|---|---|---|---|
| A | 16 | A1 | 6 | B,C |
| | | A2 | 2 | B |
| | | A3 | 4 | B,C |
| | | A4 | 4 | C |
| B | 6 | B1 | 4 | A,C |
| | | B2 | 1 | A,C |
| | | B3 | 1 | A,C |
| C | 10 | C1 | 7 | A,B |
| | | C2 | 3 | B |

ARRANGEMENT FOR AND METHOD OF PROVIDING RADIO FREQUENCY ACCESS TO A SWITCHING SYSTEM

FIELD OF THE INVENTION

The invention relates to radio communication systems and, more particularly, to an arrangement for providing a radio communication system access to a switching network.

BACKGROUND OF THE INVENTION

The telecommunications service vision for the future includes personal communications services (PCS), a term which denotes ubiquitous service for voice, data and other digital services from/to any place. The PCS service definition also includes radio ports for providing ubiquitous wireless access to the switched network from small, lightweight, low-power PCS radio terminals (portables or mobiles). Another future telecommunications network might be a wireless subscriber loop, in which the link between customers and the network is a fixed or nearly fixed radio link rather than copper twisted-pair. We illustrate our invention in the context of PCS but it is fully applicable to other radio access networks such as wireless subscriber loop.

With reference to FIG. 1A, an illustrative prior art proposed PCS network is shown. Each geographical area, called a microcell (M1–MM), includes a radio port (RP1–RPM) used to transmit and receive multiplexed radio frequency (RF) signals to/from multiple mobiles (101–110, 111–120). Each mobile has a separate channel in the multiplexed RF signal (e.g., 101 uses RF1). The different radio frequency (RF) channels served by a radio port are defined in time (i.e., TDMA), frequency (i.e., FDMA), or code space (i.e., CDMA), or some combination thereof. Each RF signal channel received by the radio port is processed by a multi-channel receiver module (e.g., MCR1) which produces a received digital signal stream from each channel (e.g., D1R from RF1R). Similarly, the transmitted signals require a multi-channel transmitter module (e.g., MCT1) at the radio port. The radio ports are connected via dedicated baseband digital lines (130) to a local radio access controller (140) which provides access to the switching network (160) via dedicated baseband digital lines (150).

In a PCS network, there are expected to be numerous radio ports, each using low power and radiating in a limited geographical area called a microcell. Smaller cells allow more frequency re-use within a geographical area, thus resulting in a larger capacity (maximum number of calls for given radio spectrum) in that area. With smaller cells, the RF transmission power can be lower. A microcell is expected to have a radius from 150 to 300 meters. For many scenarios, e.g., residential suburbs, the microcell size choice is driven more by low power (10 to 100 mW) requirements than capacity requirements. The small cell size results in a very large number of microcells, each with a radio port, needed to cover a given geographical area. Consequently, with the large number of radio ports needed, it is important that radio ports be low-cost. Also, a multitude of radio ports requires an extensive radio access controller and interconnection network for connecting all the radio ports. Thus, a continuing problem exists to reduce the cost of the physical implementation of a PCS network. In contrast to the cells of today's cellular systems, the average traffic demand per microcell is very small, with significant temporal variations. There exists a need for a system that can allocate capacity and resources to the microcells efficiently and dynamically in response to traffic fluctuations.

FIG. 1B shows another illustrative prior art proposed PCS network with analog RF transport and fixed simulcasting (for example, see Cablevision Systems Corporation's *FCC Experimental License Progress Reports*, November 1992 and August 1993). Radio access within a microcell (M1–MM) is provided by a platform microcell repeater (R1–RM). The multi-channel transmitter (MCT1) and receiver (MCR1) in FIGS. 1A and FIG. 1B are similar and operate in the same manner. In FIG. 1B, they are shared by the microcells M1–MM and located remotely from them in base station 180. The radio users in FIGS. 1A and FIG. 1B (101–110, 111–120) are identical and operate in the same manner. The air interface signals are transported in analog form between the repeaters R1–RM and the base station over coaxial cable network 170. In the repeaters, the downstream signals and upstream signals undergo block frequency conversion in the transmit block frequency converters (TFC1–TFCM) and the receive frequency converters (RFC1–RFCM), respectively. The base station 180 provides access to the switching network 160 using digital lines 150. Capacity is shared among a group of microcells by radiating the same air-frequency signal from the repeaters of the microcells in the group. In the upstream direction, the information received by each repeater is combined with that of other repeaters in the group. We call this mode of operation single-frequency simulcasting.

Prior art microcellular systems that use analog RF transport, like the one shown in FIG. 1B, use fixed simulcasting in which the composition of the simulcast group of microcells is predetermined and fixed. Since the microcells of a simulcast group also define a radio coverage area over which capacity is shared, there are fixed simulcast areas in which capacity is shared. The prior art includes the concept of cell-splitting in which a simulcast group is split into two simulcast groups in order to accommodate a growth in traffic. The prior art systems are limited, however, in that they cannot respond to dynamic variations in the spatial distribution of traffic. While the radio port in the prior art has some of the technology needed for effecting a reconfiguration of the simulcast group, tile prior art systems do not include a control architecture that supports dynamic reconfiguration. Moreover, superimposing a control architecture on the system shown in FIG. 1B is not sufficient.

SUMMARY OF THE INVENTION

In accordance with the present invention, reduced cost and improved service are provided in a wireless communication system by dynamic and efficient allocation of hardware resources and frequency spectrum. This is achieved by being able to flexibly assign and reassign traffic carried by a large number of radio ports to available hardware resources. The microcellular system includes a local radio access controller which dynamically controls the assignment of a radio port to one of a plurality of sets, each served by a radio port group server. Radio ports in one set are operated in single-frequency or multi-frequency simulcast mode. Multi-frequency simulcast refers to operation in which tile information transmitted from multiple radio ports is the same, but the air-frequency bands are different. The radio ports in one set share the capacity of a radio port group server, and all the capacity of the radio port group server can be made available to one radio port. More particularly, the present invention enables radio ports its signed to a first set to be reassigned by the server to a second radio port set in response to a predetermined condition. One illustrative condition is when the number of active users in the first set approaches the maximum user capacity of the first set. The system can be used for FDMA, TDMA, and CDMA types of radio transmissions over the air. The transport medium connecting the radio ports can be coaxial cable, optical cable, or a radio type facility. According to another aspect of the invention, radio port identification information is communicated from the radio ports to the group server by a signal either superimposed on the data signals or carried on a separate channel, thus allowing the group server to map the dynamic distribution of users.

DETAILED DESCRIPTION

With joint reference to the prior art proposed PCS network of FIG. 1 and the present invention of FIG. 2, we describe the improvement provided by the present invention.

Figure 1A:
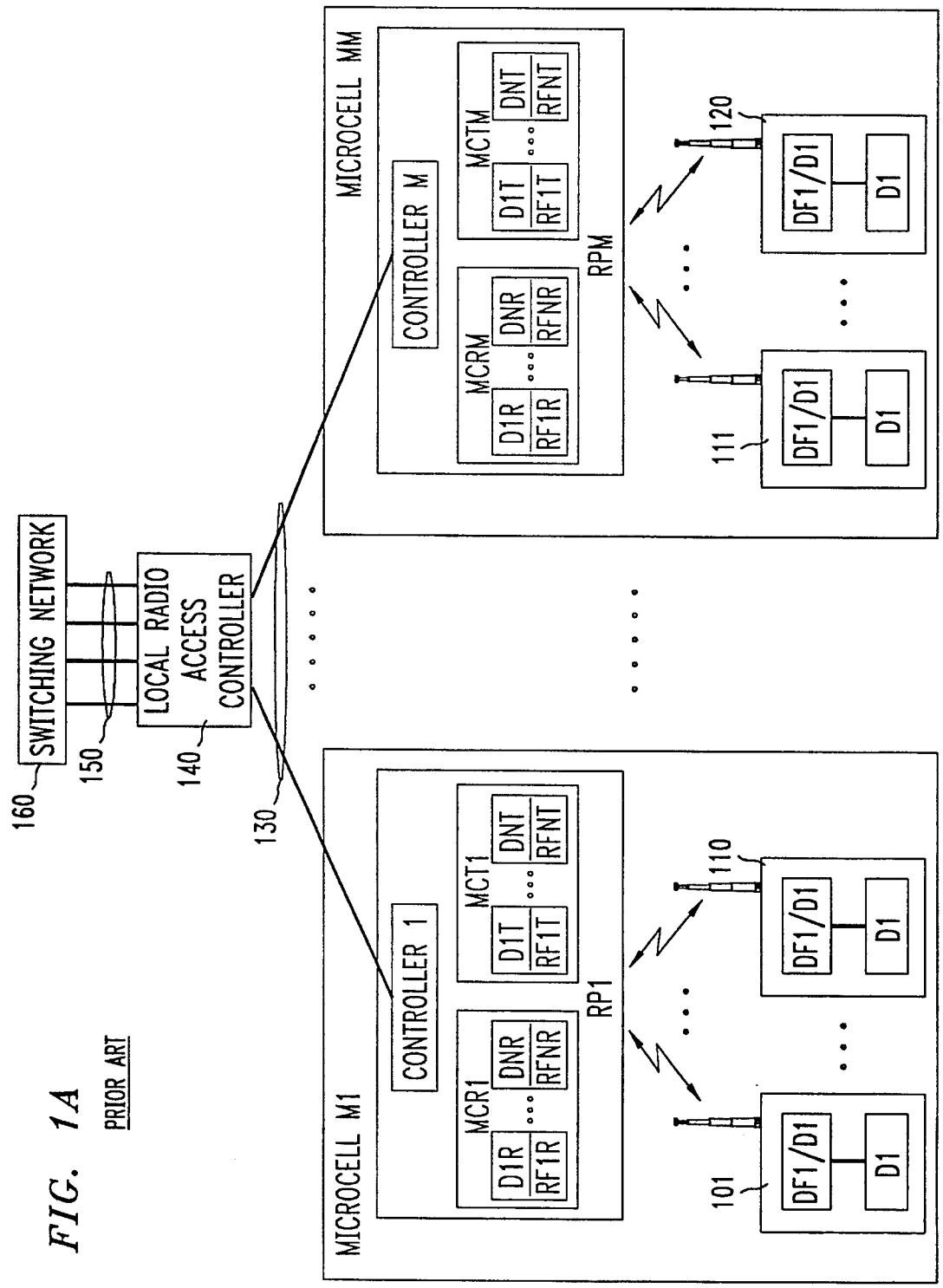
FIGS. 1A and 1B show illustrative prior art proposed PCS networks.
Figure 2A:
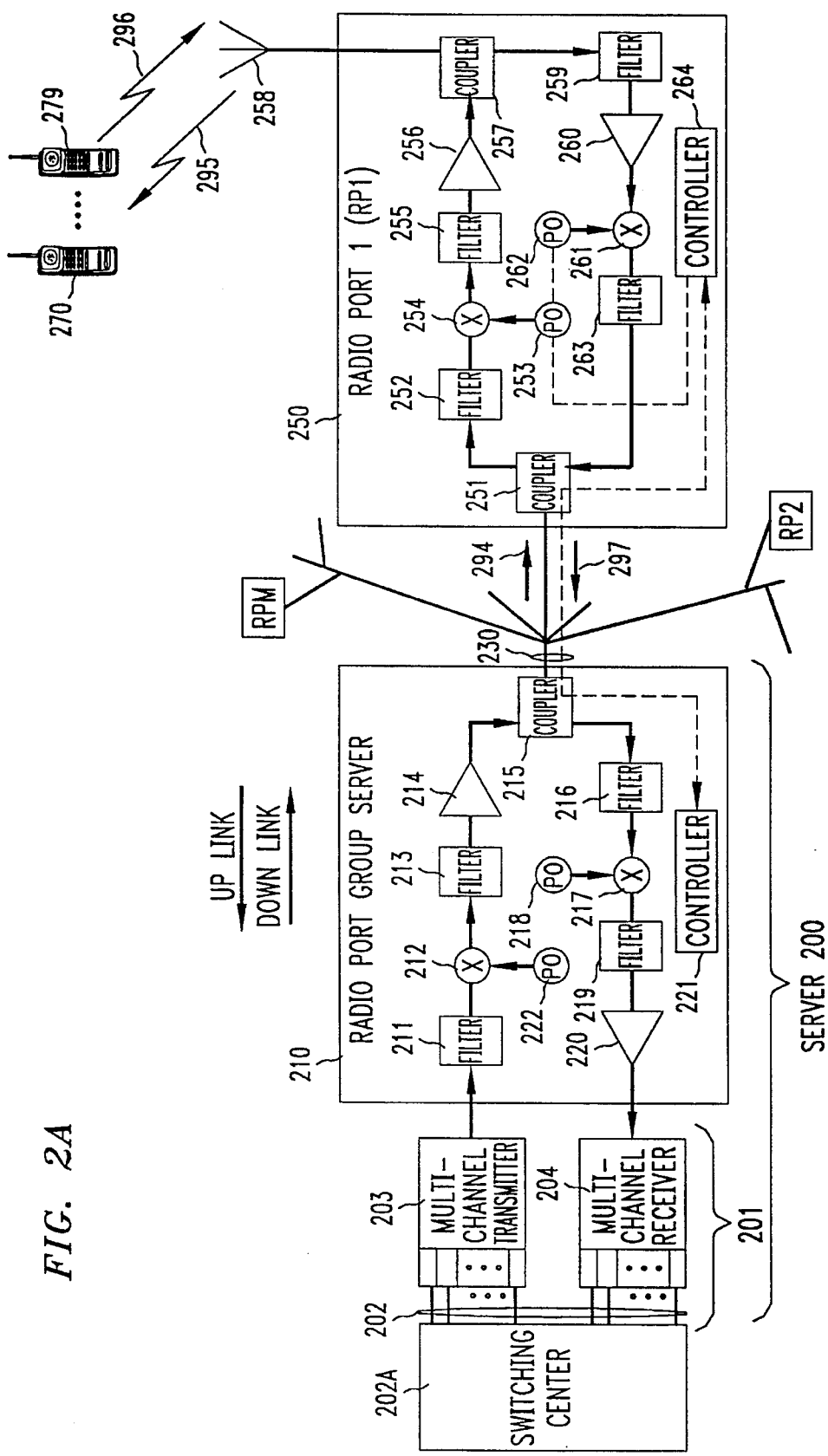
FIG. 2A shows an illustrative analog microcellular system, as defined in the present invention, including a block diagram of a radio port and the radio port group server.

The mobile units of FIG. 1A (e.g., 101–110) and of FIG. 2A (e.g., 270–279) are identical and operate in the same manner. Each mobile unit (e.g., 101) may receive voice or data which is digitized, illustratively, into a digital channel (e.g., D1) and then modulated onto one of the RF frequencies (RF1–RFN) available at radio port RP1. In the example of FIG. 1A, mobile unit 101 was assigned RF frequency RF1, although it could have been assigned to any unoccupied radio frequency in the frequency band RF1–RFN handled by radio port RP1.

The multi-channel receiver module MCR1 of RP1 receives the modulated signal RF1R transmitted from mobile unit 101 and converts it into the received digital signal D1R. Similarly, the transmitted digital signal D1T is modulated by multi-channel transmitter MCT1 to produce a modulated signal RF1T (RF1T≠RF1R) transmitted from RP1 and received by mobile unit 101. Controller 1 of RP1 controls the selection of the radio frequencies RF1–RFN and the modulation/demodulation of the digital signal/RF signal, respectively. Controller 1 also controls the transmitting/receiving of the digital signals to/from the Local Radio Access Controller (LRAC) 140 over one of the communication facilities 130. In radio port RPM, controller M and multi-channel receiver module MCRM and multi-channel transmitter module MCTM perform the same functions for mobile units 111–120.

It should be understood that, while the present invention of FIG. 2A is described as utilizing well-known Frequency-Division Multiple Access (FDMA) over the common-air interface. other well-known modulation schemes such as Time Division Multiple Access (TDMA) or Code Division Multiple Access (CDMA) could also be utilized.

With reference to FIG. 2A, we briefly describe the features of the present invention. One feature is the use of low-cost, small radio ports. Since in the illustrative embodiment of FIG. 2A we are using a coaxial distribution network 230 utilizing analog transport and dynamic FDMA, the function of the radio port RP1 is that of a receiving/transmitting antenna and frequency converter. This is implemented with very low-cost RF components. The components used here are close to the bare minimum for any radio port attached to a broadband coax medium. Any analog transport scheme using broadband coax would typically use frequency conversion to enable transport at frequencies compatible with the coaxial cable transmission characteristics as well as the frequency spectrum of other services which share the cable (e.g., cable television (CATV) distribution). The use of programmable oscillators (PO) rather than fixed ones provides an improvement of the present invention over the prior art illustratively shown in FIG. 1B. The programmable oscillator allows the radio port to dynamically access any of the radio port group servers which are on the same network. For example, each radio port group server would be assigned its own frequency band for communicating to its simulcast set of radio ports over the shared broadband network. By simply retuning the programmable oscillator in the radio port, the radio port could be reassigned from the simulcast sets of a first radio port group server to that of a second radio port group server. The simulcast groups of radio ports access their respective radio port group servers using dynamic frequency-division multiple access (FDMA). This functionality is achieved at nominal increase in cost and complexity and will be discussed more completely in the description of FIG. 3.

Another feature of the present invention is the centralized location and sharing of hardware resources. The radio ports do not include digital transceiver resources. Instead, these transceiver resources are located centrally at the server 200 location. Further, the dynamic FDMA feature of the present invention allows optimal sharing of the transceiver resources. Since the radio ports share resources at a central location and do not have dedicated resources, two important cell-planning issues of adequate radio coverage and adequate capacity (spectrum and transceiver resources) are decoupled. Radio ports (microcells) can be installed to provide adequate radio coverage, while the capacity demands of a geographic region are met by the aggregate capacity of all the multi-channel transceivers at the hub. Since resources are not dedicated in small quantities such as 2 to 7 channels per microcell, but shared in large quantities such as 20 to 70 channels per flexible group, there are statistical gains in resource budgeting to achieve a desired amount of blocking. For example, assume each microcell is expected to have peak traffic load of 2 active calls and the desired blocking probability is 1%. In the prior art shown in FIG. 1A, at each microcell a transceiver with 7 frequency channels (N=7) must be installed. If we consider 10 such microcells, then there are a total of ten transceivers installed, each with capacity of seven channels, 70 transceiver channels in total. In the present invention, a transceiver which serves 10 microcells would have to have 30 frequency channels to provide the same blocking probability, a 56% reduction from the dedicated case. These 30 channels would be shared by the mobile units served by all the radio ports, RP1–RPM, served by server 200 of FIG. 2A. Thus, each of the radio ports RP1 . . . RPM can utilize up to 30 channels so long as the total of the channels utilized by radio ports RP1 . . . RPM (served by server 200) does not exceed 30 channels. Utilization of the PCS network of the present invention results in either 1) a reduced probability of blocking for a given number of mobile units or 2) a greater number of mobile units being accommodated with the same probability of blocking than is possible in the proposed prior art PCS network of FIG. 1A.

Figure 1B:
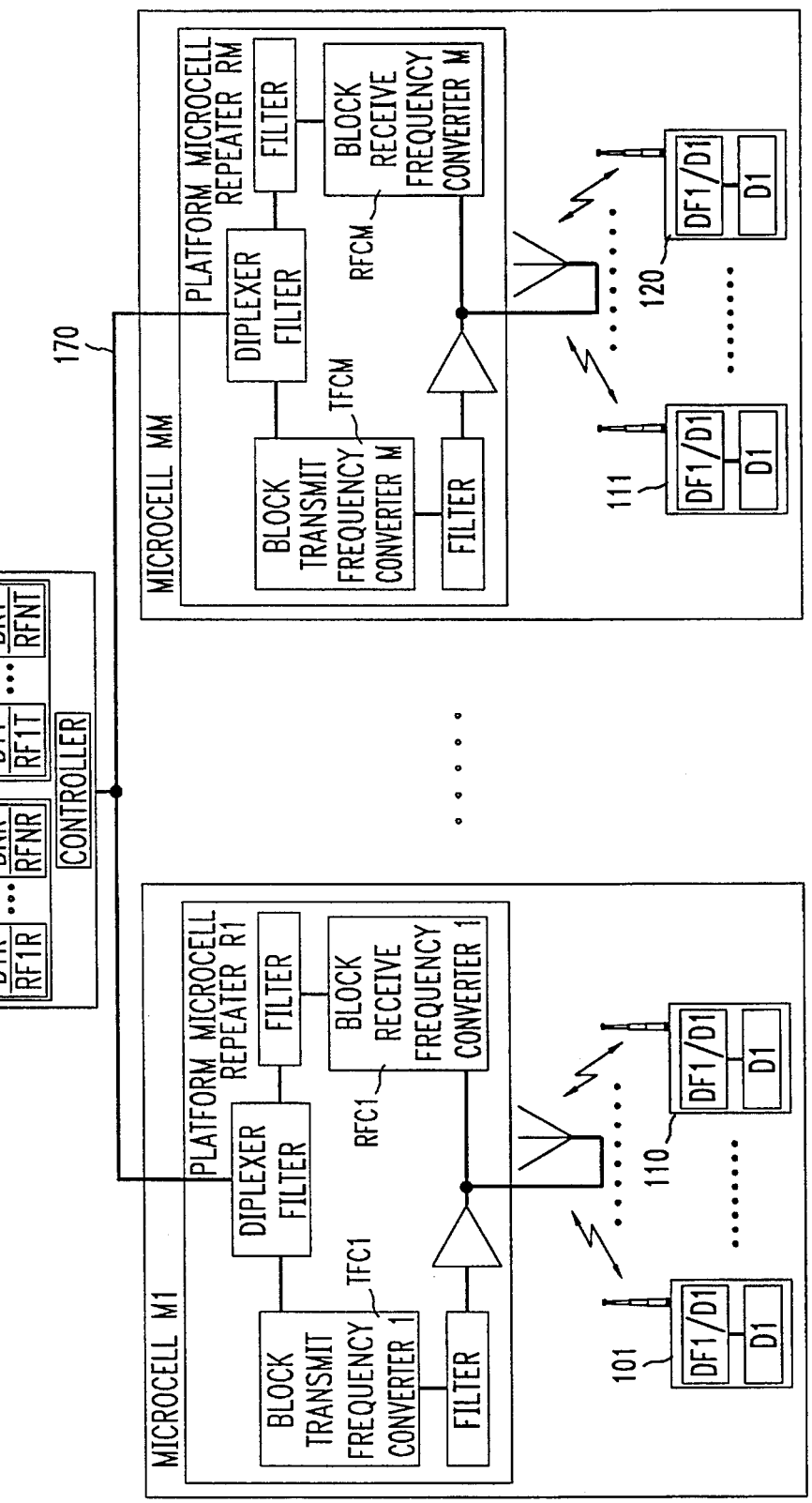
Figure 3:
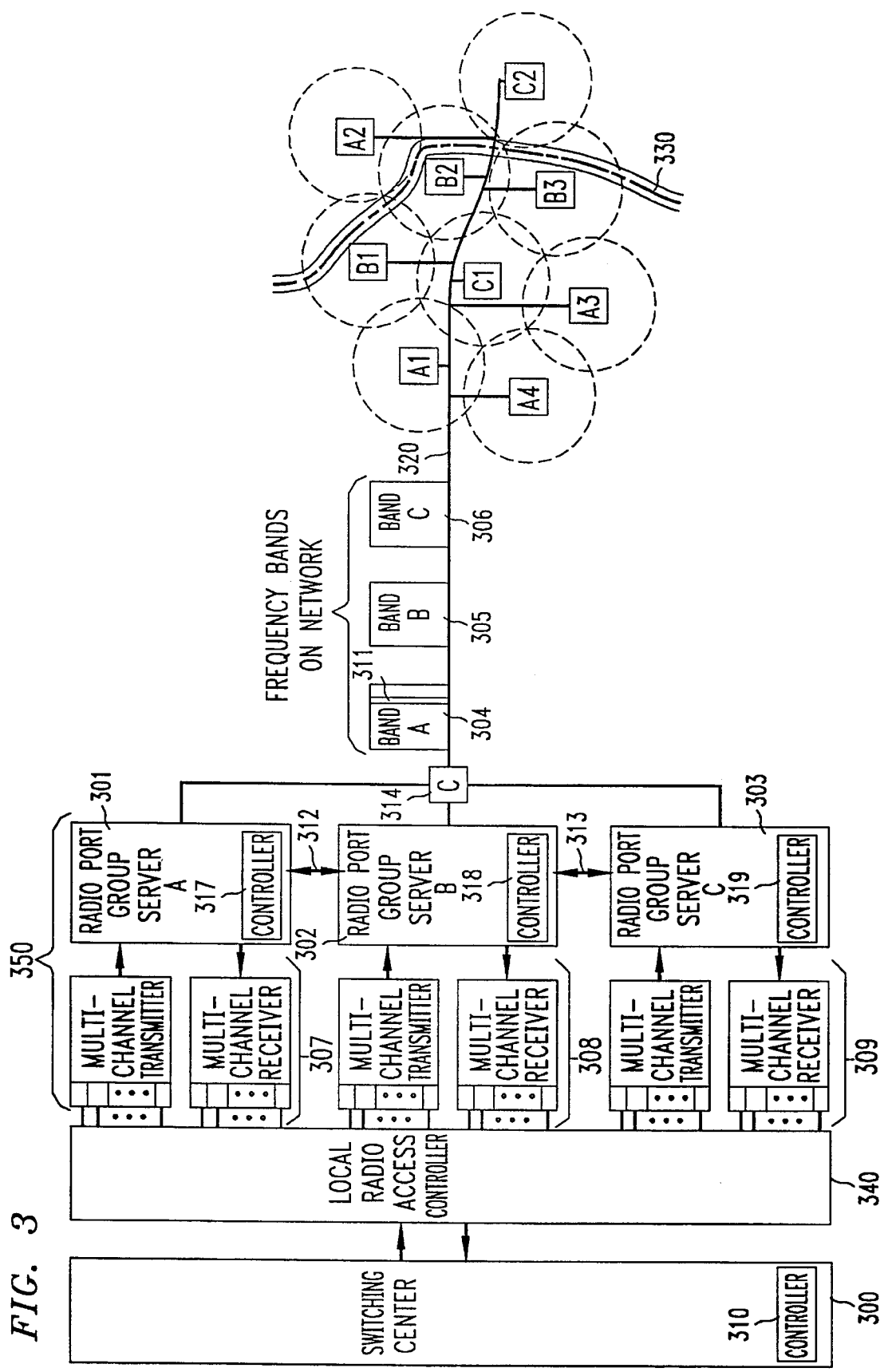
FIG. 3 shows an illustrative novel PCS network, as defined in the present invention, using RF analog transport over a coax/fiber network, and dynamic FDMA of reconfigurable simulcast groups.

With reference to the prior art shown in FIG. 1B and the present invention illustrated in FIG. 2A and FIG. 3. an improvement provided by the present invention is the ability to dynamically allocate hardware resources and spectrum. As noted, it is attractive to group together a set of microcells to form a larger group of mobiles which share capacity (spectrum and hardware resources). The FIG. 2A arrangement is designed to enable this grouping in a flexible manner. A straightforward means of grouping a set of microcells together is to radiate the same information from the radio ports of the microcells in the set. Similarly, during a receive operation, all the information at all the radio ports in the set is combined as one. This mode of operation is called simulcast. Note that we use the term simulcast to denote the simultaneous transmission of the same information from different radio ports, but the transmission can occur at different air frequencies. In the prior art (e.g., that illustratively shown in FIG. 1B), the radio ports which operate in simulcast mode are fixed, in a predetermined manner such that it is difficult to change the composition of radio ports in the simulcast groups; we term this fixed simulcast. As shown illustratively in FIG. 3, the present invention provides for multiple radio port group servers to share the same broadband medium using FDMA. By exploiting the functionality of the programmable oscillators and filters in the radio port, each radio port can be assigned to select the signal from any one of the radio port group servers. Thus the set of radio ports which communicate with one radio port group server and form a simulcast group can be modified in an arbitrary and dynamic manner. This capability further increases the efficiency of transceiver use because the effective number of users sharing the resources is larger than in the fixed simulcast case. Thus even fewer transceiver channels are required to provide a particular blocking probability. We shall term this operation dynamic simulcast. A system involving simulcast typically involves a handoff when the mobile moves from one simulcast group to another, but not when a mobile moves within a simulcast group.

Figure 4A:
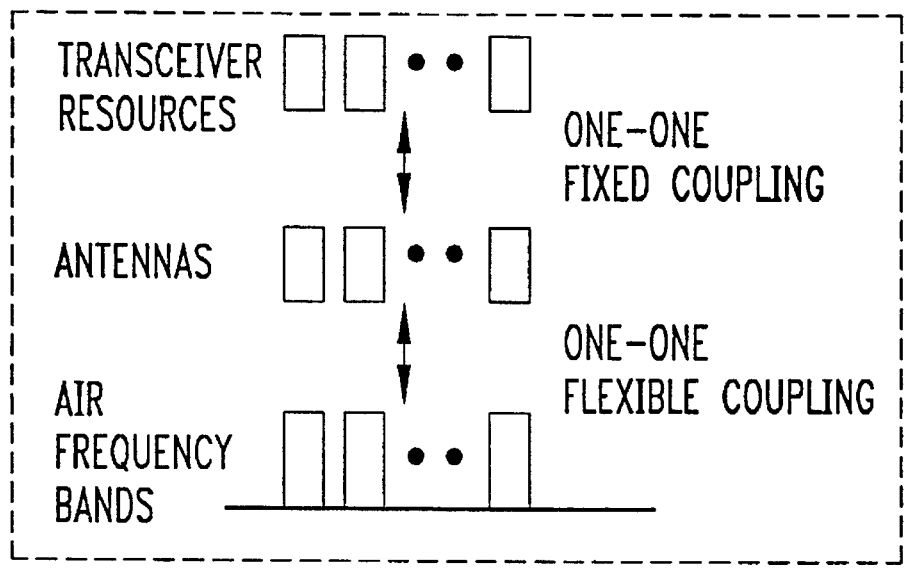
FIG. 4A shows prior art fixed channel allocation.
Figure 4B:
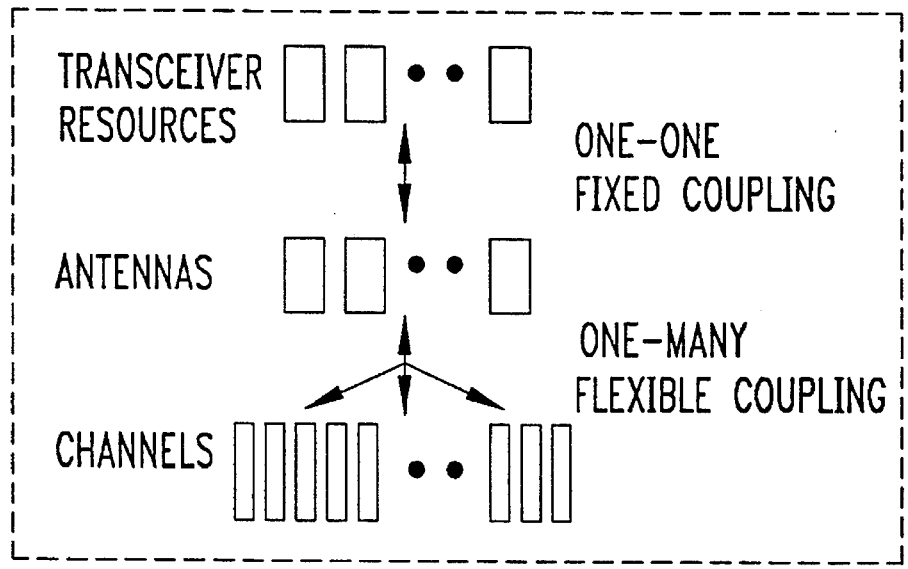
FIG. 4B shows prior art dynamic channel allocation.
Figure 4C:
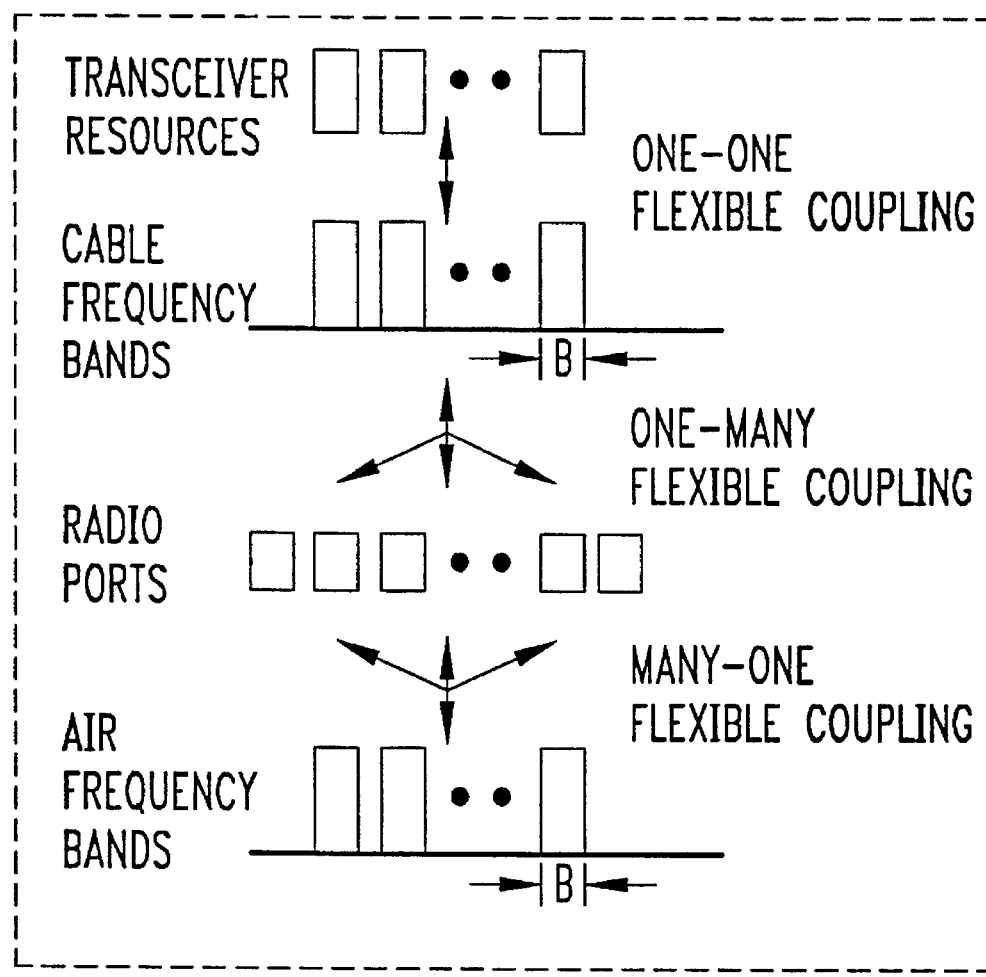
FIG. 4C illustratively shows dynamic channel and resource allocation of the present invention.

In our scheme, all the users in tile microcells that are part of one simulcast group share capacity, which is dictated by spectrum as well as hardware resources. In the prior art classic cellular paradigm with Fixed Channel Allocation (FCA), the air spectrum and hardware resources are shared by the users in one cell, as depicted in FIG. 4A. In FIG. 4A, each antenna has a one-to-one relationship with the air frequency bands (each air frequency band may include one or more channels). In the classic cellular paradigm with Dynamic Channel Allocation (DCA), the hardware resources are shared within one cell while the air spectrum is shared across multiple cells as shown in FIG. 4B. In other words, the air channels that can be used at one antenna are not fixed to one band, but are dynamically allocated. In both cases, the hardware resources are dedicated to each cell. Under non-uniform traffic distribution across cells, even though the spectral resources are used efficiently through dynamic channel allocation, tile hardware resources at each cell must be budgeted for some maximum traffic. This could be wasteful, especially as the size of (micro)cells shrinks. In comparison, the present invention shares both spectrum and hardware resources. As shown in FIG. 4C, the assignment of radio ports to cable bands (with each cable band serving one simulcast group) is flexible. So is the choice of the air bands used at each of the radio ports. Dynamic allocation is achieved by dedicating hardware resources and spectrum to each resource-sharing group server, and allowing the assignment of microcells to group servers to be dynamic and flexible. Capacity allocation thus involves channel allocation as well as hardware resource allocation.

Additionally, the dynamic simulcast feature of the present invention reduces the effect of "hot spots". A hot spot is a highly localized group of radio users which can potentially overload a microcell. For example, mobile units located in automobiles stuck in a traffic jam overload the local microcells while other microcells along the highway remain less utilized. In a system with immobile users, such as wireless subscriber loop, a hotspot can occur when one or more users in one microcell take up a lot of bandwidth. Dynamic allocation enables the server to reassign a radio port from a busy simulcast group to another less busy simulcast group, thereby enabling the remaining radio ports of the busy simulcast group to increase their average traffic per cell. In the most extreme case, a single radio port can take all the resources of the multi-channel transceiver, the simulcast group therefore consisting of exactly one radio port.

With reference to FIG. 2A, in accordance with the present invention, we have recognized that there are statistical advantages obtained by removing the multi-channel transmitter/receiver (transceiver) module (e.g., MCR1 and MCT1 typically found in an RP1, as shown in FIG. 1A) from each radio port RP1–RPM and co-locating them as part of multi-channel transceiver 201 of server 200. The result is that multi-channel transceiver 201 resources are shared among all mobile units of all of the microcells (RP1, RP2, . . . RPM) rather than having each microcell transceiver shared only among the mobile units of that cell.

In our PCS network of FIG. 2A, each radio port RP1–RPM does not demodulate the RF signal to a digital signal stream as in FIG. 1, but rather functions as a frequency converter to convert the modulated RF signal to a frequency band compatible with the coaxial cable, optical fiber, or microwave radio distribution network, hereinafter network 230, used to distribute the RF signals between server 200 and radio ports RP1–RPM. (In the case of optical fiber, an electronic-to-optical conversion is also necessary.) The network 230 can utilize a tree-and-branch or other topology. The signals carried between the server 200 and the radio ports RP1–RPM are multiplexed, modulated RF analog signals (analog transport). The frequency conversion of the RF frequencies in the radio ports RP1–RPM ensure that low-loss and spectrum-compatible transmission occurs over the network 230.

The RF components utilized in radio port RP1 250, of FIG. 2A, are essentially the same low-cost RF components that would have been utilized in the RF front end of the radio ports of FIG. 1. However, the programmable oscillators (PO) 253 and 262 replace the fixed oscillator of the radio ports of FIG. 1.

The PCS network of FIG. 2A includes a server 200 including radio port group server 210 and multi-channel transceiver 201 which connects over dedicated baseband digital lines 202 to switching center 202A. The server 200 connects over network 230 to radio ports RP1 (250), RP2 through RPM. Radio port RP1 (250), as well as the other radio ports RP2–RPM, communicate using radio frequencies to their respective mobile units (e.g., 270–279). Controller 221 of server 200 sends/receives control signals over a control signaling channel of network 230 to controller 264 of radio port 250. The control signal enables controller 221 of radio port group server 210 to control the frequency of programmable oscillator 253 and 262 of radio port 250.

As previously noted, the multi-channel transceiver 201 of server 200 includes the transceiver utilized by radio ports RP1–RPM. Radio port group server 210 includes narrow band filter 211 which couples the multiple bands of analog frequency signals from the multi-channel transmitter 203 of transceiver 201 to mixer 212. In mixer 212, the multiple frequency bands from filter 211 are mixed with the frequency from programmable oscillator PO 222 into the cable spectrum frequency bands shown by 290 of FIG. 2B. The bandpass filter 213 couples the signals from mixer 212 to amplifier 214 which amplifies the signal before it is coupled through directional coupler 215 to network 230.

For illustrative purposes, assume radio port 250 is handling the downlink frequency band (shown as 294 of FIGS. 2A and 2B) that extends from 480.0–480.7 MHz. At radio port 250, the frequency band signal at 480.0–480.7 MHz passes through splitter/coupler 251 to bandpass filter 252. The filtered output signal then is up-converted or modulated in mixer 254 with a 1700 MHz signal from PO 253 to generate a 2180.0–2180.7 MHz signal (shown as frequency band 295 of FIGS. 2A and 2B). The 2180.0–2180.7 MHz signal is filtered by narrow-band filter 255, amplified by amplifier 256 and coupled via directional coupler 257 to antenna 258 of radio port 250. The 2180.0–2180.7 MHz signal is then transmitted to the active mobile units 270–279.

The corresponding 2130.0–2130.7 MHz uplink signal (shown as frequency band 296 of FIGS. 2A and 2B) is received from the active mobile units (270–279) by antenna 258 and coupled by directional coupler 257 to narrow-band filter 259. The uplink signal output of narrowband filter 259 is amplified by amplifier 260 and down-converted or demodulated in mixer 261 using a 2100 MHz signal from PO 262 to obtain a 30.0–30.7 MHz signal representing the uplink frequency band (shown as 297 of FIGS. 2A and 2B). The output of mixer 261 is filtered by 263 and coupled by directional coupler 251 to network 230.

At radio port group server 210, the 30.0–30.7 MHz uplink frequency band signal 297 is coupled by directional coupler 215 to filter 216. The output of filter 216 is demodulated in mixer 217 using the signal from PO 218, filtered by filter 219 and amplified by amplifier 220. The signal output of amplifier 220 is converted to a digital signal in the multi-channel receiver 204 of transceiver 201 and sent over digital lines 202 to switching center 202A.

Figure 2B:
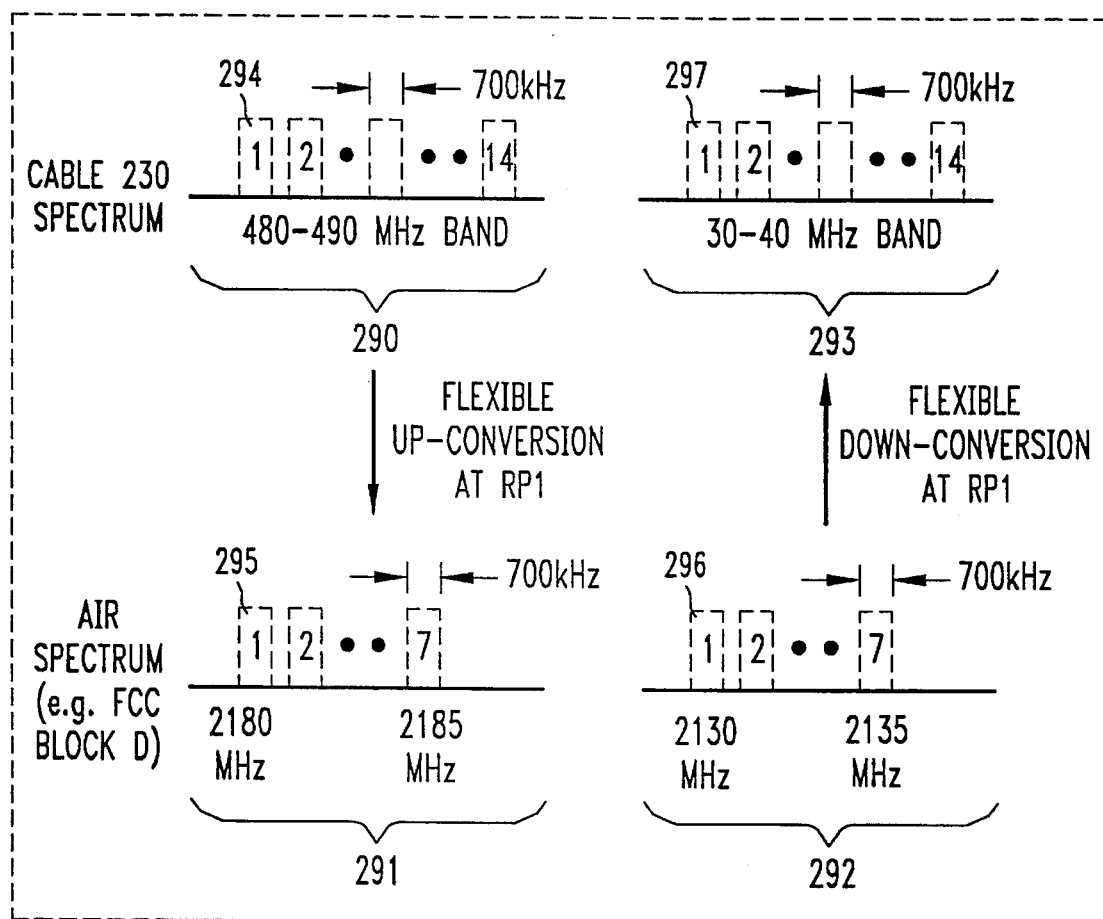
FIG. 2B shows an example of the frequency spectrum plan on the coax cable as well as on the air.

As shown in FIGS. 2A and 2B, radio port server 210 handles the frequency band 1 (comprising the frequency band 480.0–480.7 MHz). The frequency band 1 can be accessed by any of the radio ports RP1–RPM which connect to network 230. Assuming that the frequency band 1 can handle 10 channels, control unit 221 can assign 10 communication channels among the users in microcells M1–MM served by the radio ports RP1–RPM. Thus each of the radio ports RP1–RPM can serve up to 10 active users so long as the total number of active users served by radio ports RP1–RPM does not exceed 10 active users.

With reference to FIG. 3, we describe how a server 350 (including multiple radio port group servers 301, 302 and 303) can share, via coupler 314, the distribution network 320 and radio ports A 1–A 4, B 1–B 3, and C 1–C 2. In FIG. 3, group servers 301, 302, and 303, transceiver hardware resources 307, 308, and 309, and radio ports A 1–A 4, B 1–B 3 and C 1–C 2 operate in the same manner as previously described in FIG. 2. Server 350 connects, via local radio access controller 340, to switching center 300.

In FIG. 3, we describe our proposal of using dynamic FDMA to achieve dynamic simulcast. Each simulcast group server 301–303 is mapped to its own cable frequency band 304–306, respectively, and allocated a set of transceiver hardware resources 307–309, respectively. In each group server, all the users in the microcells belonging to the group share the network band and hardware resources. Thus, for an FDMA air interface format, a user in it microcell served by radio port A 1 can use a frequency channel 311 and maintain that channel when he/she moves to another microcell in the same simulcast group, such as the microcell served by radio port A 2. For TDMA and CDMA air interface formats, the network channel will be determined by a time slot and a user code respectively. Moreover, users served by radio port A 1 can "hog" all the channels of frequency band A 304 allocated to server A 301, leaving no channels for users in the microcells served by radio ports A 2, A 3, and A 4. Hence, the total channel allocation to server A 301 can be arbitrarily shared among the radio ports A 1, A 2, A 3, and A 4. This is the same as fixed simulcast.

According to the dynamic simulcast feature of the present invention, the assignment of radio ports can be changed from one group server to another in response to predetermined conditions. Assume, for example, that group server B 302 and its associated radio ports B 1–B 3 (microcells) are located to serve a highway 330. Assume that the server group B 302 has transceiver hardware 308 sufficient to handle M channels (or users). As previously noted, tip to M channels can be utilized by any of the radio ports B 1–B 3 so long as the total used by all of the radio ports B 1–B 3 does not exceed the M channels allocated to group server B 302. Assume now that a traffic jam has occurred in the microcell served by radio ports B 1 and B 2 resulting in increased user traffic, while downstream of the traffic jam the microcell served by radio port B 3 has little user traffic. According to the present invention, the controller 318 of group server B 302 includes means for detecting when the number of active users equals a predetermined number M1 which is less than or equal to its user capacity M. When this occurs, the controller 318 of group server B 302 communicates over path 312 to the controller 317 of group server A 301 to arrange the reassigning of radio port B 3 to group server A 301. If group server A 301 is operating at an active user load of N 1, well below its maximum user capacity of N, then it may be willing to accept that assignment of radio port B3 as long as the resulting user load N2 is still less than N. The result is that radio port B 3 would be reassigned as radio port A 5 as part of group server A 301. Group server B 302 would then be able to distribute its total user capacity M among only radio ports B 1 and B 2. The result is that each radio port B 1 and/or B 2 could now accept additional users.

If user traffic further increased, it might be possible for group server B 302 to reassign radio port B 1 or B 2 to group server A 301 or to another group server, C 303, if excess capacity were available thereat. Rather than having controller 318 of group server B 302 checking with both the controllers 317 and 319 of group server A 301 and group server C 303, respectively, it may be more practical to have local radio access controller 340 monitor user traffic at group servers A-C and do the reassignment control function. The dynamic simulcast feature enables any radio port to access any multi-channel transceiver 307–309 of server 350. Rather than a single multi-channel transceiver being shared by a fixed set of radio ports as in fixed simulcast, all of the server 350's multi-channel transceivers are shared by all the radio ports connected to the server. This results in even more efficient use of the transceiver 307–309 resources because the sharing group is larger than in the fixed simulcast case.

Figure 6A:
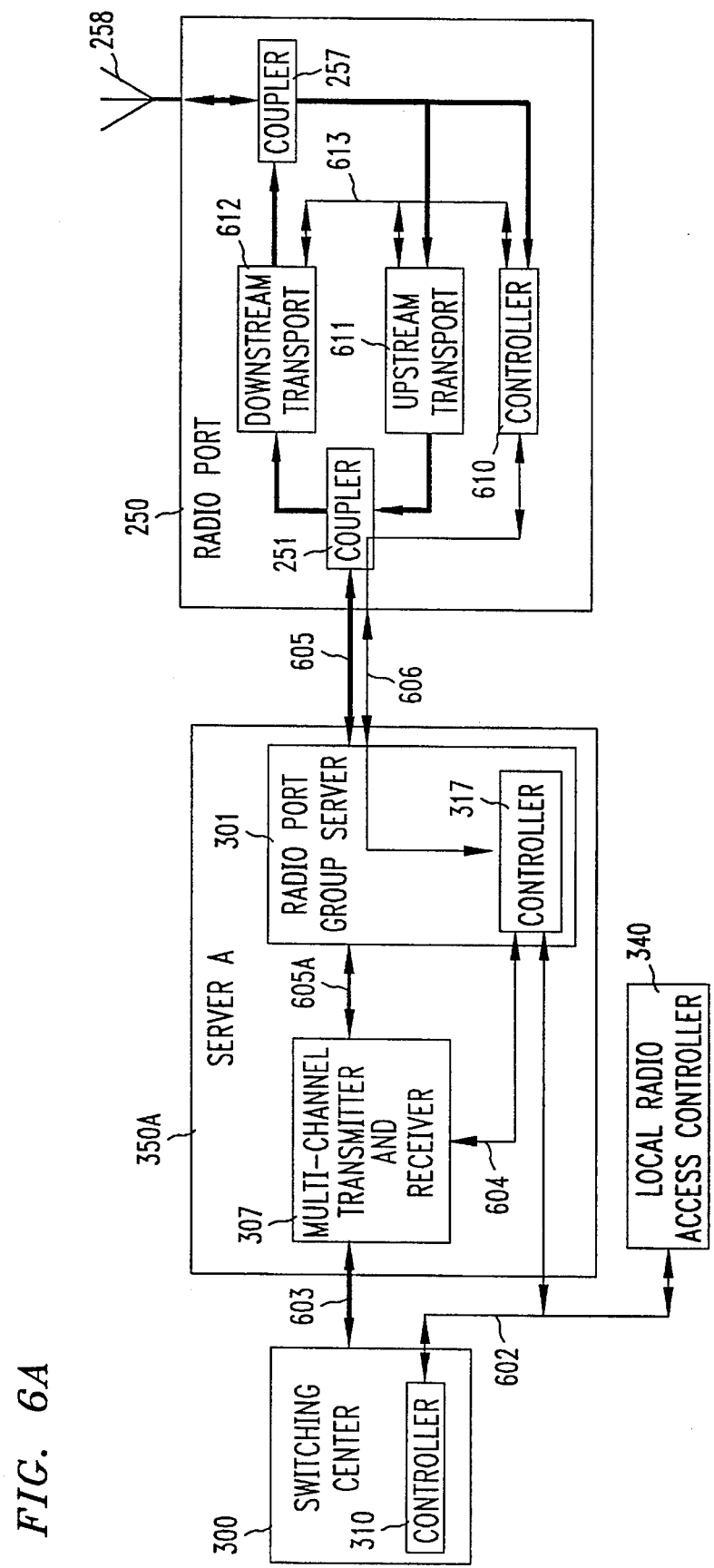
FIG. 6A shows an illustrative system control architecture of the present invention.

FIG. 6A illustrates a system control architecture of the present invention. The local radio access controller 340 is shown along with controller 310 of switching center 300, server A 350A, and a radio port 250. The control paths (e.g., bus or channel 602, 604, 606) are shown as line lines, and data paths (e.g., bus or channel 603, 605, 605A) are shown as bold lines. The controller intelligence can be distributed over one or more of the controller subsystems 310, 317, 340, and 610, or centralized at the radio access controller. The different controller subsystems 310, 317 and 340 communicate over a control channel. A digital control bus 602 provides control interfaces between the local radio access controller 340, the switch controller 310, and the radio port group server controller 317. A passband control channel 606 is provided between the radio port group server and the radio ports. The passband control channel 606 could be common for all of the radio ports in one group by using a common frequency carrier on the communications medium. It is also possible to have a dedicated control channel for each radio port. According to another aspect of the invention, the control information could be superimposed on the upstream air interface signals transported from the radio port to the radio port group server. Note that it is possible to implement the control architecture of the dynamic simulcasting system without altering the air interface protocol. The control channel 606 is used primarily to enable the dynamic monitoring of system condition and to perform dynamic reconfiguration by changing assignment of the radio port from one cable band (and radio port group server) to another. The downstream transport 612 and upstream transport 611 sections perform similar functions to the illustrative group of components (252–256) and (259–263), respectively, in FIG. 2A. A control bus 613 provides interfaces between the downstream transport section 612, upstream transport section 611 and controller 610. The controller 610 has direct access to the received, upstream air interface signal. A possible use for this is to provide a radio port control function whereby the controller 610 monitors the received RF power. If the RF power is below a predetermined level as would occur when there are no active users in that microcell, the controller 610 could switch the radio port to standby by switching off the upstream amplifier (e.g., 260 of FIG. 2A). This would reduce the thermal noise delivered to the radio port group server A 301.

Another radio port control function can be to support the Radio Port Identification and User Mapping (RPIUM) procedure, which we describe here. The controller 610 and the upstream signal transport section 611 of the radio port jointly send information back to the local radio access controller 340 to identify the particular radio port being used by each user. RPIUM procedures can be implemented with superimposed phase, frequency, or amplitude modulation.

Figure 6B:
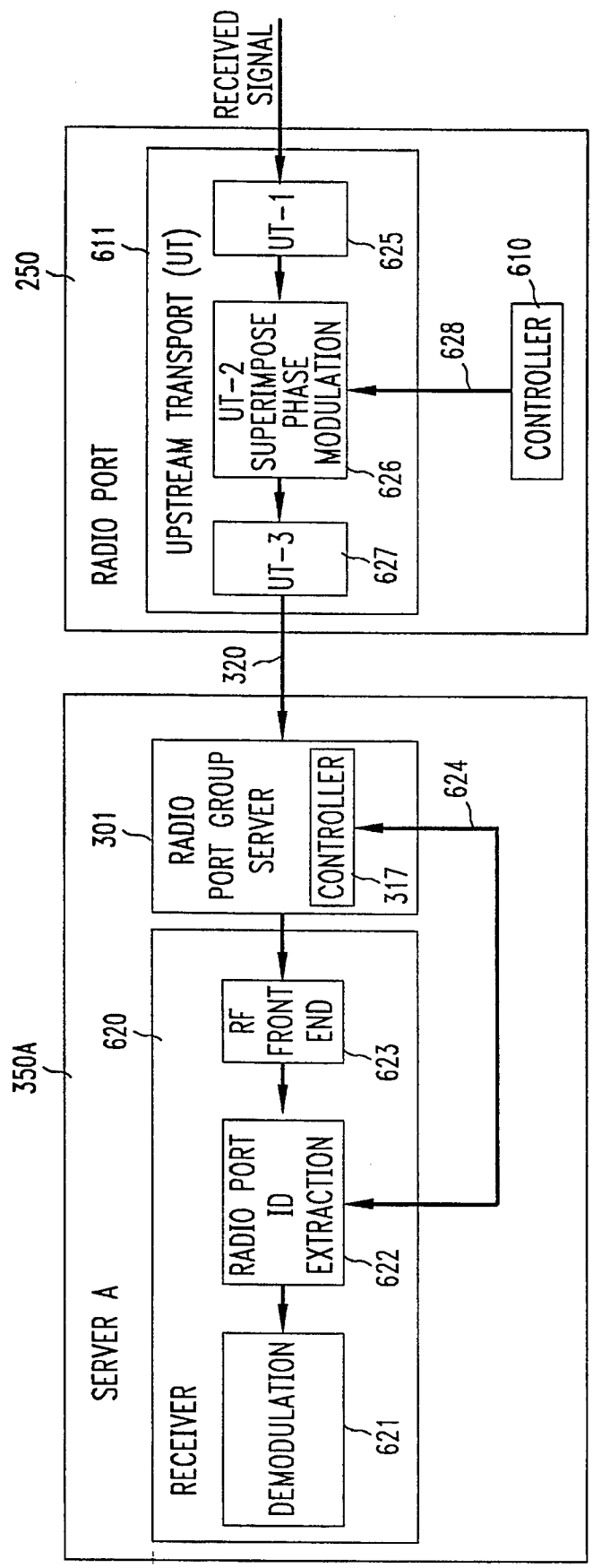
FIG. 6B illustratively shows a radio port identification procedure, of the present invention, using superimposed phase information.

FIG. 6B illustratively shows an RPIUM procedure using superimposed phase information. The upstream transport section 611 of FIG. 6A is divided into sections UT-1 (625) and UT-3 (627). Radio port ID information is transmitted on a control channel 628 from the controller 610 and superimposed as phase information in a UT-2 stage 626. The signal with superimposed radio identification is transported upstream over the network 320. The radio port group server 301 that serves the simulcast group to which the radio port 250 belongs selects and block translates the frequency band of the simulcast group. The receiver 620 selects the user channel through the RF front end 623. The radio port ID information is extracted in the radio port ID extraction stage 622 and sent to the controller 317 over bus 624. This information can be shared with the various controllers shown in FIG. 6A in order to maintain a map of user distribution across the network.

The user distribution information coiled be obtained by means other than the RPIUM procedure described above. For instance, information about the number of users being served by one radio port 250 could be estimated by the total received RF power at that port.

Figures 7A, 7B:
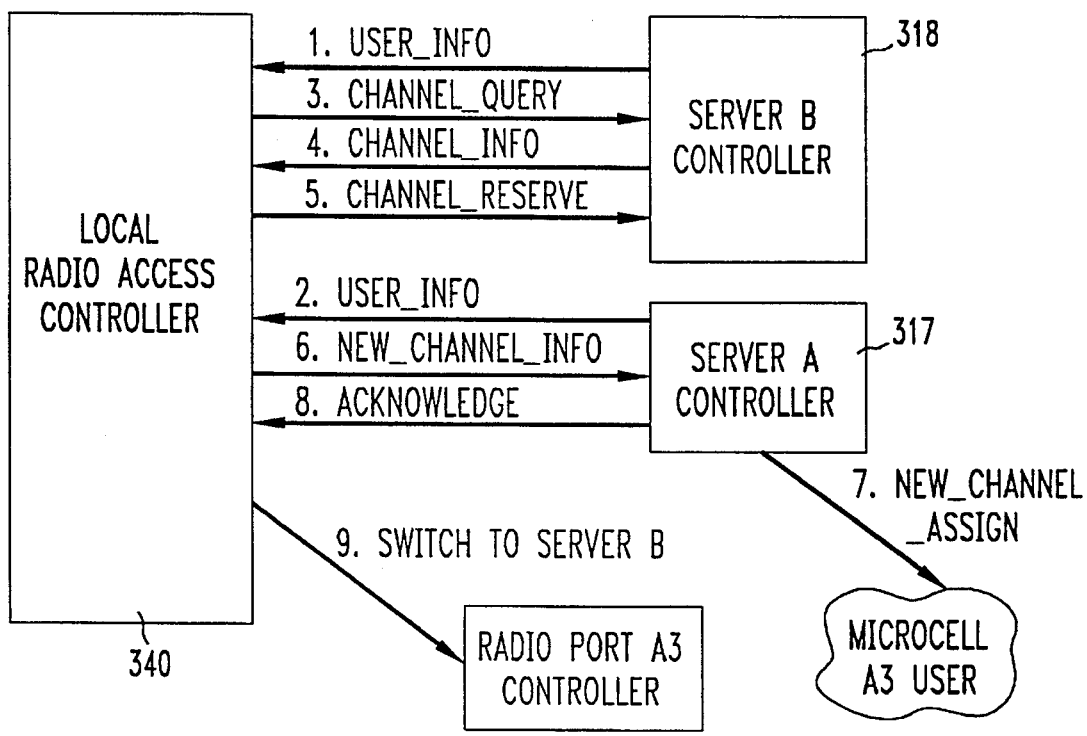
FIG. 7A shows an illustrative system load condition.
FIG. 7B shows an illustrative control flowchart for radio port reassignment.

With reference to FIGS. 3, 7A and 7B, we describe the control mechanism for reassignment of a radio port. The radio port group servers A, B, and C in FIG. 3 serve radio ports A1–A4, B1–B3, and C1–C2, respectively. Let each radio port group server have a capacity of 20 radio users. From the RPIUM procedure, the local radio access controller 340 has a map of the user distribution. An illustrative distribution of users is shown in FIG. 7A. There are 16 users served by server A, 6 users by server B, and 10 users by server C. The radio access controller 340 detects that there is an imbalance in user load across the three radio port group servers and that server A is at 80 percent of its capacity. The local radio access controller 340 determines that about 5 users should be transferred from server A to server B. Since microcells A3 and A4 each have 4 users, they are good candidates for transfer to server B. From the radio port map as shown in FIG. 3, it is apparent that microcell A3 adjoins the simulcast zone of server B whereas microcell A4 does not. The local radio access controller 340 thus selects A3 for transfer. The above is only an illustrative reconfiguration algorithm. Other algorithms could be used to address criteria such as load balance, cell contiguity, algorithm stability, fairness, mobility tracking, etc. Also, if user map information is not available, an algorithm which blindly transfers microcells one at a time until the load is balanced could be used.

FIG. 7B shows an illustrative control flowchart for implementing dynamic reconfiguration for the transfer of radio port A3 to server B as described above. It is assumed that the RPIUM procedure includes the following steps in its operation:

1 and 2) The controllers 317 and 318 of servers A and B, respectively, send user information (USER—INFO) to the local radio access controller 340 (LRAC).

3) After determining the appropriate microcell transfer, the LRAC requests information on available user channels (CHANNEL—QUERY) from server B controller.

4) Server B controller sends information on its available user channels (CHANNEL—INFO) to the LRAC.

5) The LRAC sends a command to server B controller to reserve specific channels (CHANNEL—RESERVE) for the users of the microcell to be transferred.

6) The LRAC tells server A controller the necessary information about the new channels (NEW—CHANNEL—INFO) for the users of the microcell to be transferred.

7) Server A controller sends information about their new channel assignments (NEW—CHANNEL—ASSIGN) to the users in the transferring microcell.

8) Server A controller sends acknowledgement of the delivery of the new channel assignments (ACKNOWLEDGE) to the LRAC.

9) The LRAC sends a command to the radio port controller of the transferring microcell to switch to radio port group server B (SWITCH TO SERVER B).

Figure 5:
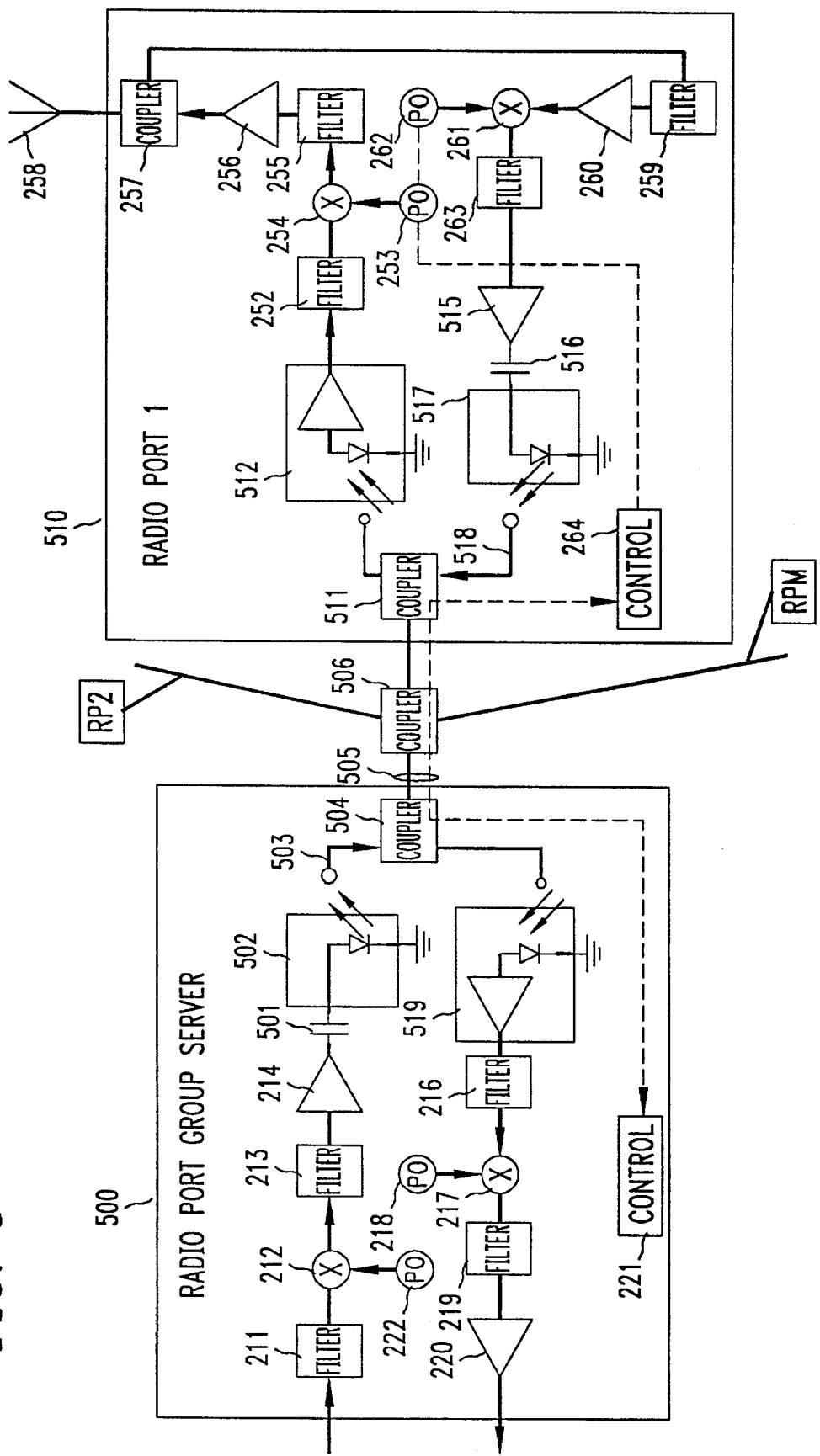
FIG. 5 shows another embodiment of a radio port, radio port group server, and transport medium of the present invention.

With reference to FIG. 5, we describe an alternative embodiment of the system shown in FIG. 2A. The radio port group server 500 includes the elements 211–214 and 216–222 of radio port group server 210 of FIG. 2A. The output of amplifier 214 is coupled via capacitor 501 to modulate optical transmitter (e.g.laser) 502. The modulated output of laser 502 passes over fiber 503 and directional coupler (combiner/splitter) 504 to fiber optic distribution network 505. The radio ports RP1–RPM connect to the fiber optic network 505 via one or more couplers 506. Radio port RP1 510 includes the elements 252–264 of radio port 250 of FIG. 2A. The modulated optical signal passes through directional coupler 511 to optical detector 512 which converts the optical signal to an RF signal and couples the signal to filter 252. It is then processed as in FIG. 2A. The mobile unit RF signals received by antenna 258 are filtered, amplified, frequency-translated (by 259–261), and coupled by filter 263 to RF amplifier 515. The output of amplifier 515 is coupled via capacitor 516 to modulate optical transmitter (e.g., laser) 517. The optical signal passes over optical fiber 518 and directional coupler 511 to fiber optic network 505. In radio port group server 500, the modulated optical signal passes through directional coupler 504 and is converted to an RF signal by optical detector 519. The RF signal output is then passed to liter 216 as previously described in FIG. 2A.

The arrangement described in FIG. 5 enables the direct modulation (and demodulation) of an optical laser intensity by (and into) RF signals and allows subcarrier multiplexing of the signals over the optical network 505. The multiple access of the radio port group servers is still achieved by FDMA of the intensity-modulated signals. Other optical modulation techniques could be used, such as phase or frequency modulation of the optical carrier. The RF frequencies over the network can be chosen such that the requirements on the optical transmitters (linearity and frequency response) are relaxed from those of typical CATV transmitters.

What has been described is merely illustrative of the application of the principles of the present invention. Other arrangements and methods can be implemented by those skilled in the art without departing from the spirit and scope of the present invention.

For example, in the description we measured the capacity of the spectrum or hardware resources in terms of number of users. A more general measure of capacity is in terms of information bandwidth, in which one user using a high data rate uses up more capacity than a low data-rate user. Also, the users mentioned throughout are not limited to end users. A user could be an interface or terminal in another communication system such as a PBX or LAN. The network does not have to be symmetric in terms of the uplink and downlink number of users or bandwidth. It is possible and may be preferable to use different multiplexing schemes and even different composition of simulcast groups for the downlink and uplink of the communication system.

The controller for monitoring the system and reassigning radio ports to radio port group servers can be located anywhere in the system, including but not limited to being separate from other system components, in one or a number of radio port group servers, in one or a number of radio ports, or distributed across any combination of the above components. The controller can transmit and receive signaling and control information to and from any combination of the switching center, radio port group servers, radio ports, and users.

The monitoring of the traffic load distribution across the multiple radio ports can be achieved by means other than radio port tagging of the uplink signals from the users. Another technique is to detect the average received RF power at the radio port which, with power control over the common-air interface, is roughly proportional to the number of active users in that microcell. Reassignment of a radio port to another radio port group server in this case would require new call setups for the users in the reassigned microcell, because the radio port group server would not know which users would be switched. The tagging of the uplink signal at a radio port is not limited to a phase modulation superimposed on the user signal. Radio port identification could also be imposed by modulating the gain of the RF amplifier, or the power of the programmable oscillator, in order to superimpose an AM tag. An FM tag could be imposed by modulating the frequency of the programmable oscillator at the radio port. The radio port identification tagging does not have to be limited to signals being sent upstream to a group server. It would be possible to tag signals in the downstream direction and let the users extract the radio port identification. The radio users could then add the radio port identification data to their upstream information signal.

The system controller could also use dynamic estimates of the distribution of users rather than direct measure, and reconfigure the simulcast groups accordingly. For example, the controller could apply an hourly and daily schedule to the configuration of the simulcast groups. The schedule would be determined from user demographics and traffic studies.

In the radio port, the filtering, frequency-translation, and transmission of the appropriate cable band could be realized by RF circuitry other than that shown in FIG. 2. For example, a two-stage frequency conversion in one or both directions might be necessary in order to effect the translation with standard image-rejection filters. In a two-stage conversion, either one or both of the oscillators would be programmable. If appropriate frequency bands are available on the shared broadband medium, it might be possible to use a single programmable oscillator for both the downlink and uplink mixers. Alternatively, the frequency band selection might be achieved with a high-performance programmable filter or sequence of filters.

The system is not limited to systems using frequency-division-duplex (FDD) over the air and over the shared broadband medium. While this is the simplest case, any combination of time-division duplex (TDD) and FDD over the cable and over the air could be accommodated. For example, with an oscillator at the radio port whose frequency is shifted synchronously with the upstream and downstream time frames of a time-division-duplex common air format, the system could operate with FDD over the transport medium and TDD over the air.

The multiple access of the radio port group servers over the shared broadband medium is not limited to FDMA. The radio port group servers could share access using CDMA or TDMA. In the case of CDMA, each radio port group server would have its own code and the radio ports of that simulcast group would select their signal by correlating with the appropriate code. It is not necessary that the downstream and upstream multiplexing be of the same type.

There are any of a number of schemes by which the controller would get information to decide on the distribution of microcells among the simulcast groups. Besides those mentioned already, the controller could simply monitor the number of active channels in a radio port group server. If it nears capacity, the controller could transfer radio ports in that group to other servers until the load is more balanced. Also, if there is frequency planning over the air in which each microcell transmits a fraction of the total air bandwidth in order to keep interference below an acceptable level, the air frequency used by the user would provide some information for user mapping.

We claim:

1. A communication system comprising a first radio port group server having an information capacity which does not exceed a predetermined information capacity for communicating over a facility to a first set of radio ports, each radio port arranged to communicate with one or more radio users over a radio link, the information capacity being shared among the first set of radio ports, a second radio port group server having a capability for communicating over said facility to one or more radio ports of the first set of radio ports assigned to said second group server and having a second predetermined information capacity, and a radio access controller for communicating with the first set of radio ports and responsive to a detected predetermined condition for changing an assignment of a first radio port from said first group server to said second group server such that said first radio port communicates with said second group server using an information capacity which does not exceed the second predetermined information capacity.

2. The communication system of claim 1 wherein said radio access controller includes a controller unit located in each radio port, all controller units arranged to communicate with each other to coordinate a change in assignment of said first radio port.

3. The communication system of claim 1 wherein said radio access controller is part of either said first or second group server.

4. The communication system of claim 1 wherein said radio access controller includes a first controller unit which is part of said first group server and a second controller unit which is part of said second group server, said first and second controller units arranged to communicate with each other to coordinate a change in assignment of said first radio port.

5. The communication system of claim 1 wherein said radio access controller communicates control information, including the change in assignment of said first radio port, to said first group server.

6. The communication system of claim 1 wherein said radio access controller communicates with the first set of radio ports via said first group server.

7. The communication system of claim 1 wherein said second group server communicates to a second set of radio ports, each radio port of the second set arranged to communicate with one or more radio users over a second radio link having an information capacity which does not exceed the second predetermined information capacity N, the second predetermined information capacity N being shared among both the second set of radio ports and said first radio port assigned to said second group server.

8. The communication system of claim 7 wherein in response to said first radio port being assigned to said second group server, said radio access controller changes an assignment of a radio port of said second set from said second group server to said first group server.

9. The communication system of claim 1 wherein said communication facility includes a control path for communicating control data between the set of radio ports and said first group server.

10. The communication system of claim 1 wherein the predetermined condition is when the information capacity utilized by said first set of radio ports reaches a pre-established capacity M1 less than M.

11. The communication system of claim 1 wherein said first and second group servers communicate over said facility with the first set of radio ports using frequency division multiple access (FDMA), wherein said predetermined information capacity M is carried over a frequency band and wherein said first and second group servers each use a different frequency band for communicating with a radio port.

12. The communication system of claim 1 wherein the first set of radio ports include programmable means for selecting a frequency band for communicating with said first group server in response to a received control signal and frequency converters for converting said selected frequency band to and from a communication channel used for communicating with the radio users.

13. The communication system of claim 1 wherein said first and second group servers communicate over said facility with the first set of radio ports using time-division multiple access (TDMA) signals, wherein said predetermined information capacity M is carried over a time slot and wherein said first and second group servers each use a different time slot for communications with the first set of radio ports.

14. The communication system of claim 13 wherein the first set of radio ports includes programmable means for selecting a time slot for communicating with said first group server in response to a received control signal and means for converting said selected time slot to and from a communication channel used for communicating with the radio users.

15. The communication system of claim 1 wherein said first and second group servers communicate over said facility with the first set of radio ports using code-division multiple access (CDMA) signals, wherein said predetermined information capacity M is carried by a code group including a plurality of channels and wherein said first and second group servers each use a different code for communications with the first set of radio ports.

16. The communication system of claim 15 wherein the first set of radio ports includes programmable means for selecting a code group for communications with said first group server in response to a received control signal and means for converting said selected code group signals to and from a communication channel signal used for communicating with the radio users.

17. The communication system of claim 1 wherein said communication facility is an optical communication facility.

18. The communication system of claim 17 wherein the first set of radio ports includes means for converting radio frequency signals, used for communicating with radio users, to and from optical signals used for communicating with said server means.

19. The communication system of claim 1 wherein said communication facility is a coaxial cable facility.

20. The communication system of claim 1 wherein said communication facility is a radio communication facility.

21. The communication system of claim 1 wherein said first and second group servers connect to a switching center said first and second group servers including transceiver means for converting communication signals, used for communicating with the first set of radio ports over the communication facility, to and from digital signals used for communicating with said switching center.

22. The communication system of claim 1 wherein the assigning of said first radio port from said first group server to said second group server is done without changing any communication frequency used for said first radio port's existing communication with radio users.

23. A communication system comprising a first radio port group server having an information capacity for communicating over a facility to a first set of radio ports, each radio port arranged to provide radio access to one or more members of a first set of radio users, identical information being radiated by all the radio ports to the first set of said radio users, and information radiated from each radio user in the first set being received by one or more of the radio ports of said first set, the information capacity being shared among the first set of radio users, a second radio port group server for communicating with a second set of radio ports over said facility, and a radio access controller for communicating with the first set of radio ports for dynamically changing an assignment of a first radio port from said first group server to said second group server in response to a predetermined condition.

24. The communication system of claim 23 in which said radio access controller is capable of monitoring and processing system load conditions.

25. The communication system of claim 1 or 23 wherein said radio access controller includes means for determining the number of radio users served by each of said first set of radio ports.

26. The communication system of claim 1 or 23 wherein said radio access controller includes means for determining the information capacity being utilized by each radio user being served by each of said first set of radio ports.

27. The communication system of claim 1 or 23 wherein each radio user communicates a radio port identification marker signal to enable said first group server to determine which radio port is being used by each radio user.

28. The communication system of claim 1 or 23 wherein a carrier frequency used in a radio link between the first set of radio ports and first set of radio users is translated in frequency at the radio ports.

29. The communication system of claim 1 or 23 wherein a downstream signal from the first group server to the first set of radio users is carried over a first frequency band of said facility, translated in frequency at the radio ports of the first set, and radiated to radio users in the first set, and wherein an upstream signal from the first set of radio users is received by at least one of the first set of radio ports, translated in frequency at the radio port to the first frequency band of said facility, and carried to the first radio port group server.

30. The communication system or claim 1 or 23 wherein said first radio port, prior to a change in assignment, receives downstream information from the first group server and transmits upstream information to the second group server and wherein, after the change in assignment, said first radio port receives downstream information from said second group server.

31. The communication system of claim 1 or 23 wherein said first radio port, prior to a change in assignment, receives downstream information from the first group server and transmits upstream information to the second group server and wherein, after the change in assignment, said first radio port transmits upstream information to said first group server.

32. The communication system of claim 1 or 23 wherein said first radio port, prior to a change in assignment, receives downstream information from the first group server and transmits upstream information to the first group server and wherein, after the change in assignment, said first radio port receives downstream information from said second group server.

33. The communication system of claim 1 or 23 wherein said first radio port, prior to a change in assignment, receives downstream information from the first group server and transmits upstream information to the first group server and wherein, after the change in assignment, said first radio port transmits upstream information to said second group server.

34. The communication system of claim 27 wherein radio link signals received from the radio users by said first radio port undergo signal processing to include the identification marker signal before being transmitted over said facility to said first group server.

35. The communication system of claim 34 wherein the marker signal is imposed by amplitude modulation.

36. The communication system of claim 34 wherein the marker signal is imposed by frequency modulation.

37. The communication system of claim 34 wherein the marker signal is imposed by phase modulation.

38. The communication system of claim 34 wherein the marker signal is imposed as an amplitude shift keying (ASK) signal by modulating the gain of an RF amplifier before transporting the signal over said facility.

39. The communication system of claim 34 wherein the marker signal is imposed as an amplitude shift keying (ASK) signal by modulating the strength of an oscillator used during frequency conversion of the signal.

40. The communication system of claim 34 wherein the marker signal is imposed as a frequency shift keying (FSK) signal by modulating the frequency of an oscillator used during frequency conversion of the signal.

41. The communication system of claim 34 wherein the marker signal is imposed as a phase shift keying (PSK) signal by modulating the phase of an oscillator used during frequency conversion of the signal.

42. The communication system of claim 27 wherein the marker signal is communicated to said radio access controller and used by the controller to maintain a table of radio users and their respective radio ports.

43. The communication system of claim 1 or 23 wherein said radio access controller estimates a distribution of radio users among the first set of radio ports.

44. The communication system of claim 1 or 23 wherein the radio access controller estimates the onset of said predetermined condition.

45. The communication system of claim 1 or 23 wherein the predetermined condition information originates at the first set of radio ports and is sent to the radio access controller.

46. The communication system of claim 45 wherein said predetermined condition information is determined from RF power received by the first set of radio ports over the radio link to radio users.

47. The communication system of claim 1 or 23 wherein the radio access controller utilizes knowledge of frequency bands used in an air interface protocol and said facility to estimate distribution of radio users among the first set of radio ports.

48. The communication system of claim 29 wherein the first set of radio ports includes
 means for selecting a downstream and an upstream frequency band for communicating with said first group server in response to a received control signal and
 frequency converters for converting said selected frequency bands to and from the frequency bands used in the radio link for communicating with the radio users.

49. The communication system of claim 1 or 23 wherein the signals radiated by all of the first set of radio ports over the radio link are nominally identical.

50. The communication system of claim 1 or 23 wherein the radio link signal radiated by the first radio port of the first set is radiated in a first frequency band, and a second radio port of the first set of radio ports radiates in a second frequency band.

51. The communication system of claim 1 or 23 wherein said facility is shared for communications between first and second group servers and radio ports and signals from other communication systems.

52. The communication system of claim 51 wherein said shared facility is a fiber/coaxial cable used to distribute cable television signals.

53. The communication system of claim 51 wherein said shared facility is an Ethernet facility.

54. The communication system of claim 51 wherein said shared facility is a microwave link.

55. The communication system of claim 1 or 23 wherein at least one radio user is a mobile radio terminal which moves from the radio link coverage area of one radio port to another.

56. The communication system of claim 1 or 23 wherein at least one radio user is an immobile radio terminal.

57. The communication system of claim 56 wherein said immobile radio terminal provides an interface to enable communications between a second communication system and said communication system.

58. A method of operating a communication system comprising the steps of
 at a first radio port group server,
 communicating over a facility to a first set of radio ports, with an information capacity which is shared among the first set of radio ports;
 at each radio port,
 communicating with one or more radio users over a radio link having an information capacity which does not exceed the information capacity;
 at a second radio port group server,
 communicating over said facility to one or more radio users assigned thereto at up to a second information capacity; and
 at a controller,
 communicating with the first set of radio ports and, responsive to a detected predetermined condition,
 changing an assignment of a first radio port from said first group server to said second group server such that said first radio port communicates with said second group server using an information capacity which does not exceed the second information capacity.

59. A method of operating a communication system comprising the steps of
 at a first radio port group server,
 communicating, at a predetermined information capacity, over a facility to a first set of radio ports, each radio port arranged to provide radio access to one or more members of a first set of radio users, identical information being radiated by all of the radio ports to the first set of radio users, and information radiated from each radio user in the first set being received by one or more of the radio ports of said first set, the predetermined information capacity being shared among the first set of radio users;
 at a second radio port group server,
 communicating with a second set of radio ports over said facility; and
 at a radio access controller,
 communicating with the first set of radio ports,
 monitoring and processing communication system load conditions and, in response to a predetermined load condition,
 dynamically changing an assignment of a first radio port from said first group server to said second group server.

* * * * *